(12) United States Patent
Kalo

(10) Patent No.: US 11,445,031 B2
(45) Date of Patent: Sep. 13, 2022

(54) DATA PROCESSING SYSTEM WITH AUTOMATED SEARCH AND EXTRACTION BASED ON VERIFICATION TAG

(71) Applicant: PUZZLE THEORY INC., San Francisco, CA (US)

(72) Inventor: Ina Sofia Kalo, San Francisco, CA (US)

(73) Assignee: Puzzle Theory, Inc., San Francisco, CA (US)

(*) Notice: Subject to any disclaimer, the term of this patent is extended or adjusted under 35 U.S.C. 154(b) by 207 days.

(21) Appl. No.: 16/595,406

(22) Filed: Oct. 7, 2019

(65) Prior Publication Data

US 2020/0112615 A1    Apr. 9, 2020

Related U.S. Application Data

(60) Provisional application No. 62/742,020, filed on Oct. 5, 2018.

(51) Int. Cl.
*G06F 16/483* (2019.01)
*H04L 67/50* (2022.01)
*H04L 67/53* (2022.01)
*H04L 67/306* (2022.01)
*G06F 16/438* (2019.01)

(52) U.S. Cl.
CPC ......... *H04L 67/20* (2013.01); *G06F 16/4393* (2019.01); *G06F 16/483* (2019.01); *H04L 67/22* (2013.01); *H04L 67/306* (2013.01)

(58) Field of Classification Search
CPC . G06F 16/483; G06F 16/4393; H04L 67/306; H04L 67/20; H04L 67/02; H04L 67/22
See application file for complete search history.

(56) References Cited

U.S. PATENT DOCUMENTS

| | | | |
|---|---|---|---|
| 8,656,286 B2* | 2/2014 | Convertino | ........... H04L 67/025 715/744 |
| 9,081,777 B1* | 7/2015 | Krawczyk | ............... G06F 16/41 |
| 11,025,582 B1* | 6/2021 | Paul | .................... G06F 16/4393 |
| 2012/0117484 A1* | 5/2012 | Convertino | ............. H04L 67/22 715/744 |
| 2013/0218865 A1* | 8/2013 | Angulo | ................. G06F 16/248 707/709 |

* cited by examiner

*Primary Examiner* — Frantz B Jean
(74) *Attorney, Agent, or Firm* — CRGO Global; Steven M. Greenberg

(57) ABSTRACT

A system and method for creating and curating of a mixed media project timeline—a digital storyline about the making of a specific product or work of authorship. The system involves registering an existing project by means of a web platform, and connecting to it via the project owner's credentials external web content sources, including the project owner's social media. The system involves activation of a project verification tag, here called amptag, consisting of the ampersand sign "&" followed by the title of the project. The amptag can be included by the project owner within any content they post on the connected web sources. The system recognizes the marked content, verifies it toward the registered project and the project owner's credentials, and catapults it into the project storyline next to other original content posted by the project.

20 Claims, 10 Drawing Sheets

DATA PROCESSING SYSTEM WITH AUTOMATED SEARCH AND EXTRACTION BASED ON VERIFICATION TAG

CROSS-REFERENCE TO RELATED APPLICATIONS

This application is a non-provisional application and claims priority to U.S. Provisional Patent Application No. 62/742,020, filed Oct. 5, 2018, the entirety of which is incorporated herein by reference.

BACKGROUND OF THE INVENTION

Field of the Invention

The present invention relates to the field of film-making and more particularly to the documentation of the making of a film, a "behind-the-scenes" story.

Description of the Related Art

Traditionally, the story behind the creation of a specific work of authorship, called the "making-of" or "behind-the-scenes" story, is presented in the form of a video clip, photographic "slideshow", or other content format compiled together by the owners of the product, or the authors of the creative work, for the purposes of marketing of the final product seeking commercial realization. Further, the content files are typically manually edited to create a storyline with the usage of video editing software such as Avid or Final Cut. The created sequence of clips is then stored and given a navigational interface via the usage of the DVD or Blu-ray technology, and the actual discs specifically set to function for the consumer digital video format are manufactured through molding technologies.

The created and professionally edited clips, in pursuit of the same aims, reaching the audience, for the purpose of marketing the completed product, can also be uploaded onto social media platforms or other, non-socially interactive video hosting web platforms.

The requirement that the "making-of story" must be put together by the owners of the product, or by those authorized by the owners to create, promote and distribute information about the product, is apparent precisely because of the ownership rights over the product, and all liabilities related to disclosing information about the process of creation and development of a specific product, often seeking commercial realization.

In other words, when it comes to documenting and publicly sharing the "behind the scenes" or "the making of" process of a product protected by registered ownership or authorship, no audience can be decision maker or content provider: the audience, not being the maker of the product, has no first hand knowledge about the making of the product, nor can carry any liability with regard to the product, the marketing of the product, any monetary returns associated with the product, etc.

Currently, the web-based technologies, which enable the sharing of information about creative works of authorship or other type of products during the process of their making, are the "technologies for funding a project or venture by raising many small amounts of money from a large number of people", namely the crowdfunding technologies. For the purposes of marketing to those who are asked to contribute, and accountability to those who have contributed—the account owners, who register fundraising campaigns on the crowdfunding platforms can update their contributors, in free format, about the work's progress.

Such crowdfunding platforms connect makers to users for one purpose only—to reach a specific monetary goal: it is the start and the end of the campaign, that motivates the project owners to eventually put the effort to update their contributors on the work's progress. There are no set parameters or any requirements to share the actual start or completion dates for the project, nor any other information beyond the request for financial support.

Today, many companies or individual creators share information about their products and services via social networking websites.

Social networking websites, like Facebook, Twitter, Snap, Instagram and similar, in their paid and unpaid services, are indiscriminate about the topics around which content is generated, as long as it is within set guidelines, including "Community Guidelines" for inappropriate, illegal, or unsafe content. Facebook describes their "timeline" as a "visual blog about life events and an online scrapbook for all things liked by the online community". In a similar approach, the "stories" on Instagram and Snap, the "moments" on Twitter, the "Make the web tell a story" live blogs on Storify, are also constructed based on technological methods for turning each user into a content-generating machine and an open-end publisher and re-publisher. In addition, these multiple-user story-generating methodologies are currently lacking sufficient information verification or information source verification technologies, and the social networking websites named here are often open to ill-intentioned contributions.

In the current social media environment, in one instance, machine algorithms automatically determine which original content is trusted in the public wide area network based on the republishing history associated with the original content contributions of the first publisher and other first publishers, with content server systems algorithmically presenting preferred content to subsequent publishers based on a criteria including a popularity of republishing of the original content and a credibility scoring of the first publisher and other publishers.

In other instances, and in addition to prioritizing content on high engagement by regularly publishing content sources, the current ongoing initiatives to improve content integrity include attaching additional information to the original content contribution of the first publisher, generated by a machine algorithm relevant to the topic, to give the users more context about the topic, for example, a link to a Wikipedia entry.

Such noisy web environments, with many potential vectors for misinformation, have so far shown to be unfit for coherent storytelling, and often their preferred use by those who create specific works of authorship is consistent with sharing separate pieces of information, in some cases dressed in sensation, or pushed to a specific group of users via programmatic advertising.

Many of the social media websites allow for restricted access to the account owner's pages via site-specific security settings, but such restrictions result in limiting the very social interactions these platforms are built to encourage.

In addition, the fact that a social media website would offer uniformed, fit all, user interface (UI) and user experience (UX) on all of their public or private pages, regardless if built to share the life story of a dog, the menu and special offers of a restaurant, or the progress in the making of a feature film, is another reason why many creators prefer not to use the social networks when it comes to disclosing creative "making-of" information, but predominantly only for announcing or, if within budget, advertising the final complete product of their work.

In other cases, technological systems and methods focus on the importance of context, and allow for controlled content curation by the first publisher. Such content curation may consist of putting together in a live blog a string of embedded portions of another work of authorship, like tweets, photos, videos and media from across the web. In such case, the publisher uses and amplifies the voices of the community to create a story; promotes citizen journalism, by enabling a community to share stories that are attached to a time and a place and may showcase information on a timeline that intersects with other people's stories.

An example for a web-based technology, consisting of such context-focused method to deliver a coherent story, yet again based on putting together a work of authorship by multiple users, in a variously reusable way, is the method and system of source attribution of embedded content by Storify, Livefyre company, part of the Adobe family. With Storify a user can craft and publish blog stories with any content collected across the web, by dragging and dropping content to group certain audience moments and publish a live blog story. In addition, multiple editors can simultaneously update, review and publish the first publisher's blog story from anywhere.

The content, once collected by the user with somewhat significant effort to browse, select, drag and drop across multiple sites, into a collection, namely an assets library, can be repurposed, and "the best posts" can be used in a different blog story to re-engage readers months down the road.

Storify is an example of technology which serves well the purpose of creating a new journalistic product. The blogger would accept the potentially cumbersome work to search across the web and collect material for the crafting of a journalistic product, because the newly adopted material represents the very building blocks of that new journalistic product. Such technological approach however is not suitable for building a making-of storyline about the behind-the-scenes of a specific work of authorship.

The "making of", "behind-the-scenes" material is pre-owned material, which tells a story about an existing product, already covered by an authorship of work. In the case, in which the project owner might have already shared or may already be in the process of sharing parts of that material on the web, the effort to visit each of these web destinations to collect their own material, may become not only cumbersome but also redundant.

Furthermore, the option to create a story, which is open for republishing and editing by anyone makes such method completely inapplicable for the purposes of disclosing a story about a work of authorship.

While the Storify method gives content curation control to the first published, thus enabling them to create a coherent story by embedding other work of authorship, the tagging method allows for anyone to drop in any tagged content into any collection marked with a tag. For example, if user 1 can post on their or another user's wall, page, etc. certain marked content, for the purposes of adding it to a theme or a topic, so can user 2, 3 and 4, etc. on the user's 1 wall, page, etc.

The content collection and content curation methods listed above, as well as the type of tagging which allows for anyone, to visit anyone else's social network page, and by replying to any of the posted content with a tag, to either add that content to a collection or start a new collection, are both applicable for "bucketing" of publicly discussed topics of interest, or simply for personal curation of collections of "likes", but not for building a story about the creation of a specific work of authorship.

In addition, the continuous multiplicity of new tags, takes away from those content sources, which may need a specific tag, often carrying the exact name of authorship. This problem is mirrored in the various mitigation attempts that Twitter offers on their site: for instance, by marking of the source of content distribution with a verification sign, or by allowing specific verified brands to use trademarked hashtags. Nevertheless, it is a fact that the hashtags are considered "free for grabs" and can be created on and outside of Twitter by anyone, and that anyone can come to mimic an existing hashtag or an existing name of a source.

Finally, the traditional film and music content sites, expected to be familiar with the concept, and the marketing benefits of "behind the scenes" and the "making of", like IMDB, Film Catalogues, Cinando, Soundcloud, Bandcamp, and similar, which potentially may include unreleased creative products, are acting solely as catalogues, which do not use storylines, timelines or any real time information about films and music in the making, and include very limited social elements, if any at all.

BRIEF SUMMARY OF THE INVENTION

Embodiments of the present invention address deficiencies of the art in respect to behind-the-scenes documentation and provide a novel and non-obvious method, system and computer program product for generating a mixed media presentation. The system includes a database configured to store media content and instructions for presenting the media content to comprise the mixed media presentation and a server connected to the database and a network. The server is configured to obtain the media content and store the obtained media content in the database. The server also is configured to communicate with a client computer and a social network computer via the network. The server yet further is configured to create the mixed media presentation in response to instructions from the client computer and transmit the mixed media presentation in response to the client computer. The server even yet further is configured to automatically obtain at least a subset of the media content by automatically searching the social network computer for a project verification tag added by the client computer and automatically copying media content from the social network computer tagged by the project verification tag to the database.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 5 is a pictorial illustrations of project management interfaces for editing and activation of an amptag;

DETAILED DESCRIPTION OF THE INVENTION

Figure 1:
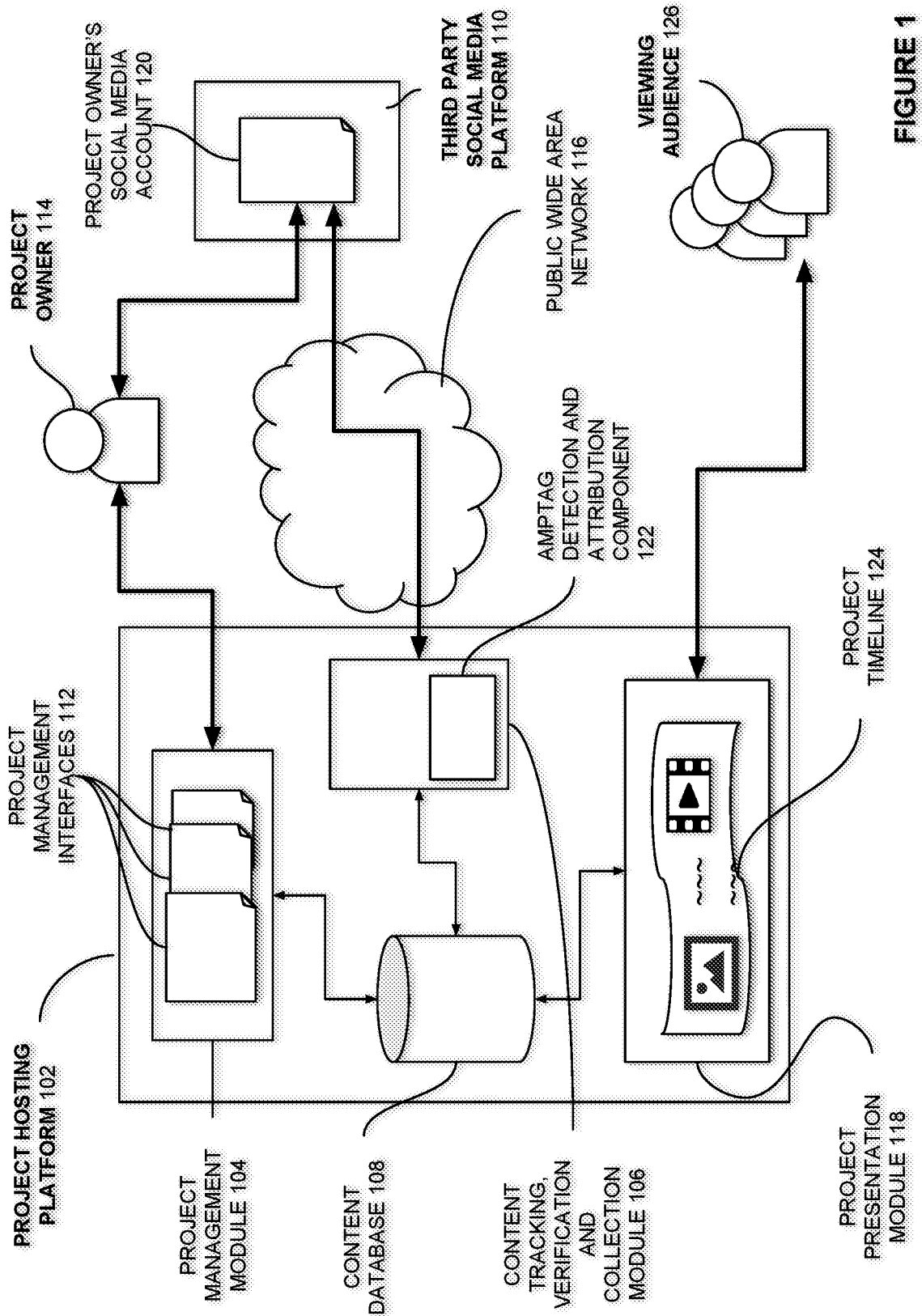
FIG. 1 is a schematic illustration of the system modules and their interactions.

Disclosed is a system for the use of a web-based technology by those who are working on a specific project, i.e., an "individual or collaborative enterprise that is carefully planned and designed to achieve a particular aim, often within a specific deadline", as defined by Oxford Dictionary, to create, curate, and publish a visually rich digital story with a timeline about the "making-of" or the "behind-the-scenes" process of creating a specific work of authorship. The "making-of" storyline, as a final product, is created without the use of expensive DVD or Blu-ray sequencing and manufacturing technology, and outside the multiple-user content-generating approach of the social media technologies, or other curation systems non-protective toward the authorship of work.

The story-building system is comprised of a project timeline curation module, which in one embodiment, allows the project owner to upload original content files from their computer into their making-of storyline, represented by a project timeline. A time machine feature and a highlighting feature allow for additional modifications, positioning and highlighting with respect to the desired time sequence and story-telling style. For purposes of this document, a module comprises software running on one or more computers.

Further, the system includes a tracking, verification and collection module which automatically tracks, identifies and extracts digital content from third party web sources, which the project owner has connected to the project timeline by using their login credentials.

In one embodiment, the system allows for creation and activation of a project amptag, which in one embodiment is comprised of the ampersand sign "&" followed by the title of the project as one word, or other relevant one-word combination of letters. The project amptag is selected and activated by the project owner within a content attribution module. Each amptag is associated with a specific project, and specific external web sources, which the project owner connects to the project via their login credentials.

Further, an amptag detection and attribution module detects all content marked by the project amptag on the web sources connected to a certain project and catapults it onto the project timeline.

No amptag can be created and activated outside the system, and no amptag can be used to initiate the creation of a project timeline.

The activation of a specific project amptag within the system requires a project that is already registered with and verified by the system It also requires that external web sources are verified by the system and connected to the project. Furthermore, the catapulting of digital content from the connected web sources onto the project timeline of a registered project in the system is permitted by the system only in regard to external web sources, which have been connected by the project owner, to the project registered in the system, verified by the project owner's login credentials.

Further, in another embodiment, the module for tracking, identification, and collection of digital content may collect additional content from the connected web sources that is not marked with the project amptag, according to a collection and delivery schedule, and aggregate it on a separate content stock-page within the project administration pages. The project owner can then manually select from the content stock-page the content applicable to their storyline and "feed it" to the project timeline.

A system and method for the creation and curation of a web-based project timeline about the making of a specific work including a work of authorship is disclosed. The disclosed system simplifies and secures the process of building a digital storyline, protected from third party interference, and based on first hand knowledge and rights to disclosure. The system facilitates the protected curation of content by giving the project owner sole control over all content. Specifically, pre-existing content from web pages or other digital sources may be combined with content directly uploaded onto the project timeline for the purpose of sharing it with the audience.

The system and method disclosed here facilitates the sourcing, curation and control of content within a single platform. The disclosed system is comprised of different modules, serving the specific technological needs to describe, document, and share with an audience the behind-the-scenes story of a specific work, including a module for tracking, verification, and collection of the sourced content, and a project management module for management and curation of all sources and all content that is uploaded directly into the project timeline, as well as administration of the entire public interface of the project.

Figure 9:
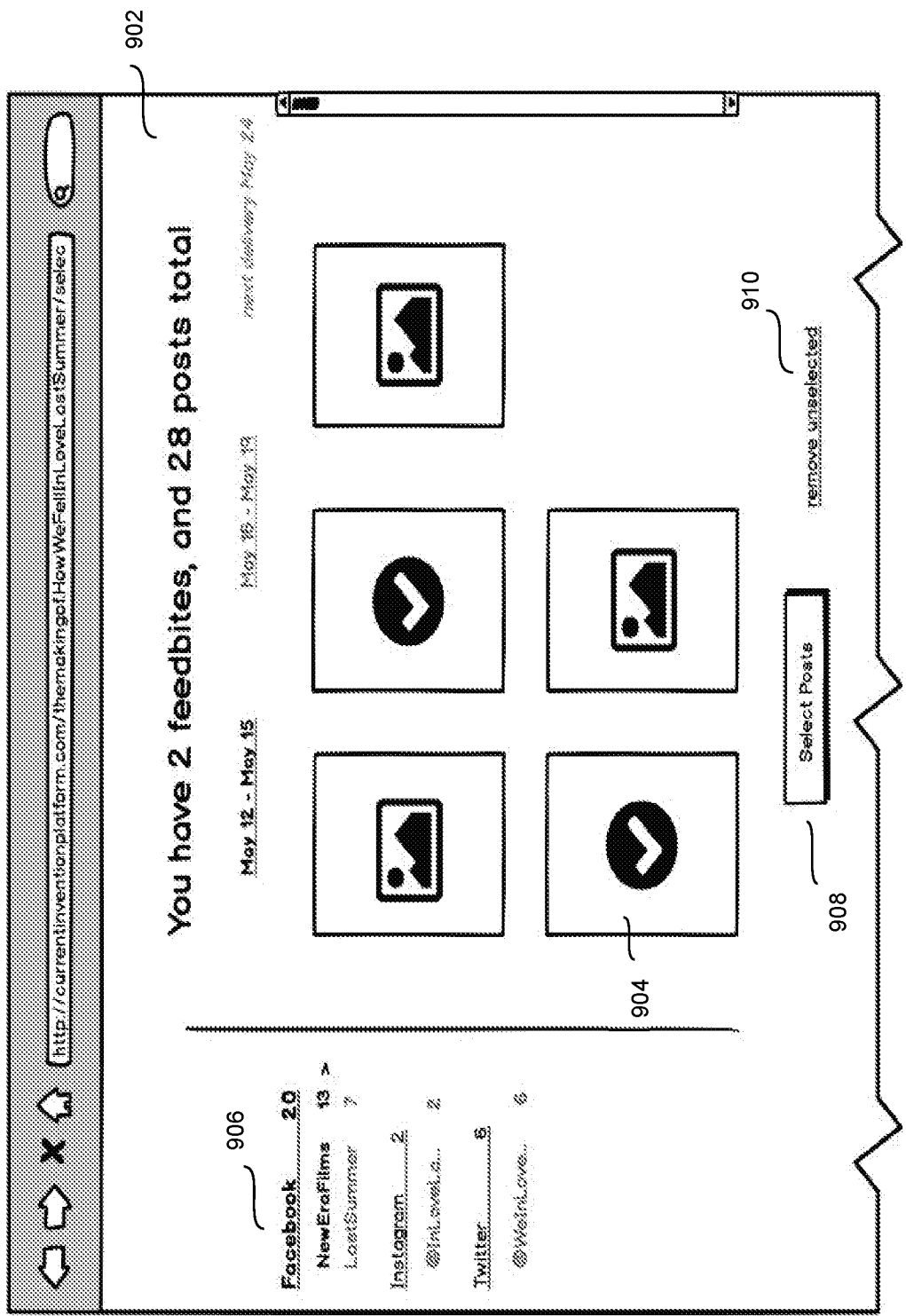
FIG. 9 is a pictorial Illustration of a project management interface, here called "feedbites lot", for aggregation and manual selection of applicable social media posts, imported from the connected Feed Sources according to a Feedbite Delivery Schedule, for the curating purposes of the project owner's making-of storyline; and, FIG. 10 is a pictorial Illustration of a public audience user interface view of the project timeline, here call the "Making-of Storyline."

In one embodiment as shown in FIG. 1 the disclosed system is realized as a project hosting platform (102) comprised of multiple modules, namely a project management module (104), a content tracking, verification, and collection module (106), a content database (108), and a project presentation module (110). The project management module (104) comprises different project management interfaces (112) for use by the project owner (114). The content database (108) serves as data storage for uploaded original content and imported pre-shared content, as it is described further in FIG. 2. The content tracking, verification and collection module (106) interacts through a public wide area network (116) with third party content sources, for instance social media platform (110) to detect newly shared content on the project owner's social media accounts (120). The content tracking, verification and collection module (106) verifies the content source according to social media account ownership, aggregates the verified content and stores it in the content database (108). The process of content aggregation is illustrated in FIG. 9 below.

The content tracking, verification and collection module (106) comprises, among other components, the amptag detection and attribution component (122) which can detect and extract content from the project owner's social media account (120) and insert it directly onto the project owner's project timeline (124), a process that is termed here "catapulting" of content. The project timeline is presented via a public UI within the project presentation module (118) which is using web technologies to deliver content to the project audience (126). Each of the modules can be software for programming the same or different one or more computers to perform the method herein. In one embodiment, project hosting platform (102) is a computer comprising one or more processors, memory, persistent storage (hard disk drive or solid state drive), network interface (e.g., WiFi or Ethernet) and user interface, all of which are connected to each other. The software described herein are program code stored on processor readable storage medium that can program one or more processors/computers to perform the methods described herein. Each registered project is managed by using different project management interfaces (112), each comprising different features for the creation and curation of the project timeline (124).

Figure 2:
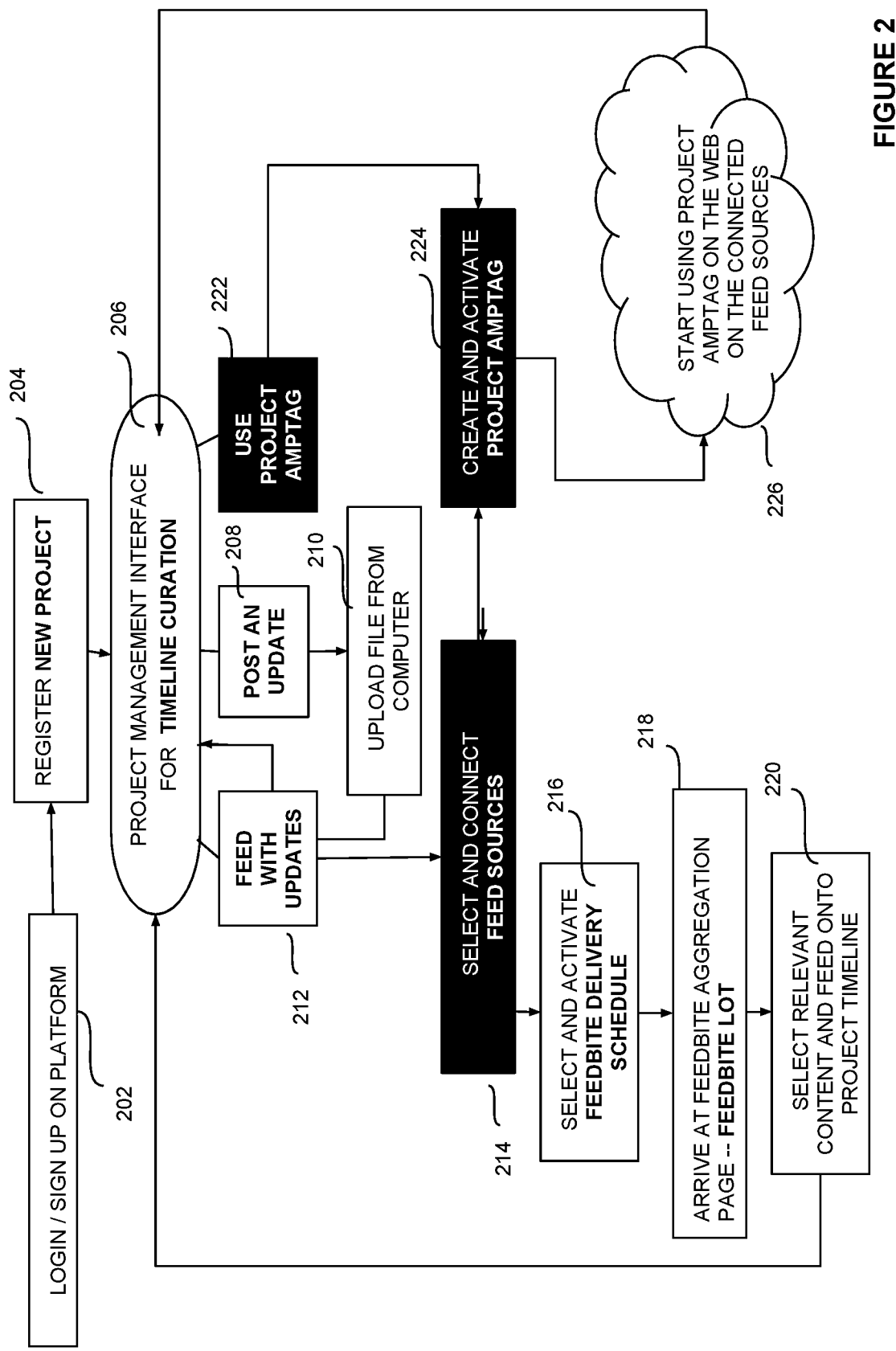
FIG. 2 is a flow chart of new project registration and amptag setup by the project owner.

FIG. 2 is a flow chart illustrating a new project registration on the project hosting platform (102) by the project owner (108), including the setup of a project amptag as well as the process of timeline curation. The project owner initiates the process by signing up and logging in to the system (202), and by subsequently registering a new project (204). As described further below, every project registration requires initial information about the project, including a project title, a start and an expected completion date for the project, a categorization of the work of authorship by type, and indication of the project's current stage of development.

The project owner is then redirected by the project management module (103) to the Project management interface for timeline curation (206). According to one embodiment, the project owner can add new content to the project timeline by posting original content directly onto the project timeline, via the "Post an Update" feature (208), which may include the uploading of digital content to the platform from a computer (210).

Figure 3:
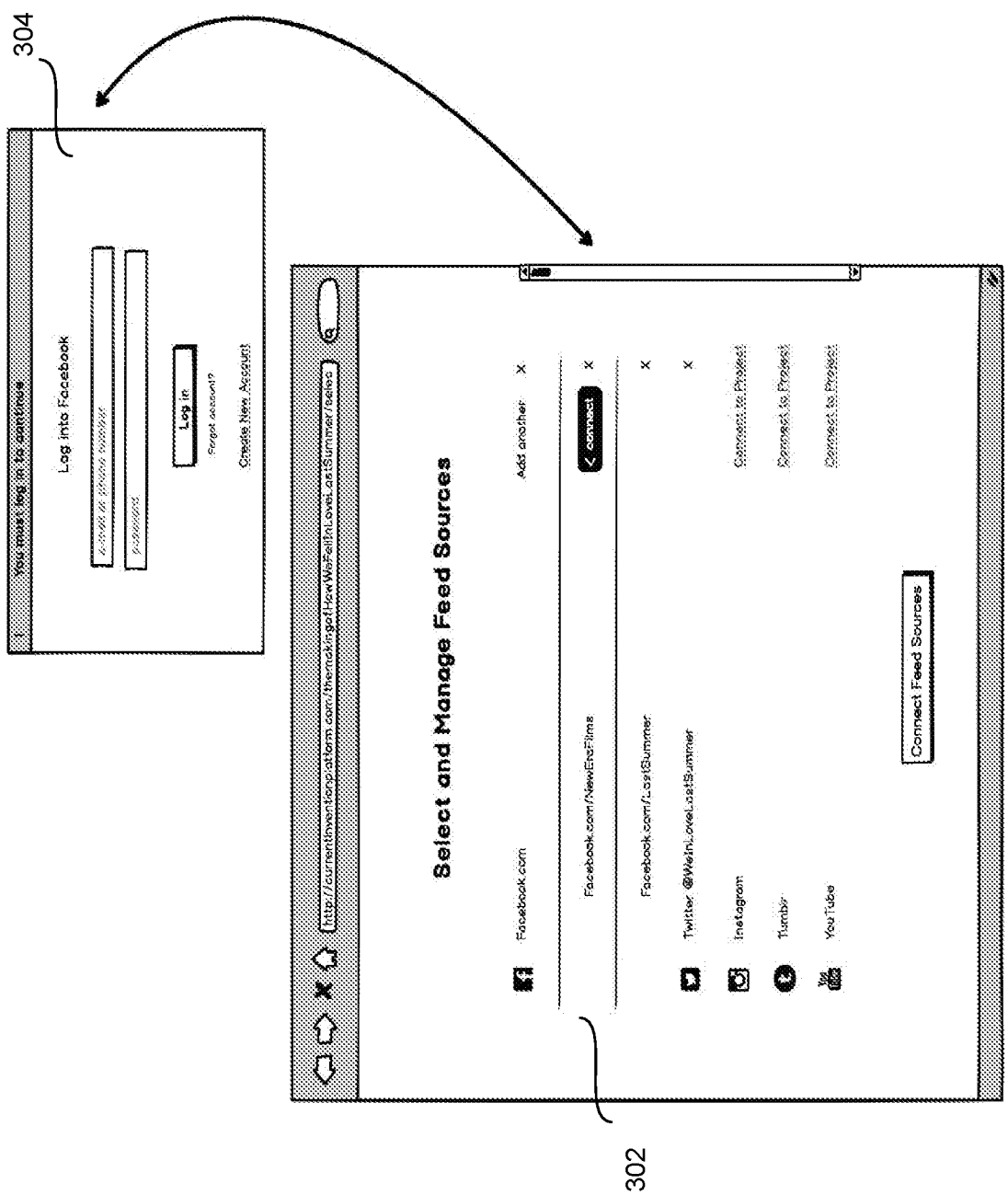
FIG. 3 is a pictorial illustration of the project management interface for connecting and managing external third-party web sources, here called "feed sources"

According to another embodiment, the project owner can curate their project timeline by selecting relevant content, aggregated by the tracking, verification, and collection module (104), via the "Feed with Updates" project management feature (212). Feed with Updates requires selecting and connecting third party web sources, i.e. the project owner's social media accounts or pages, as "Feed sources" (214). This process is illustrated in FIG. 3.

Figure 7:
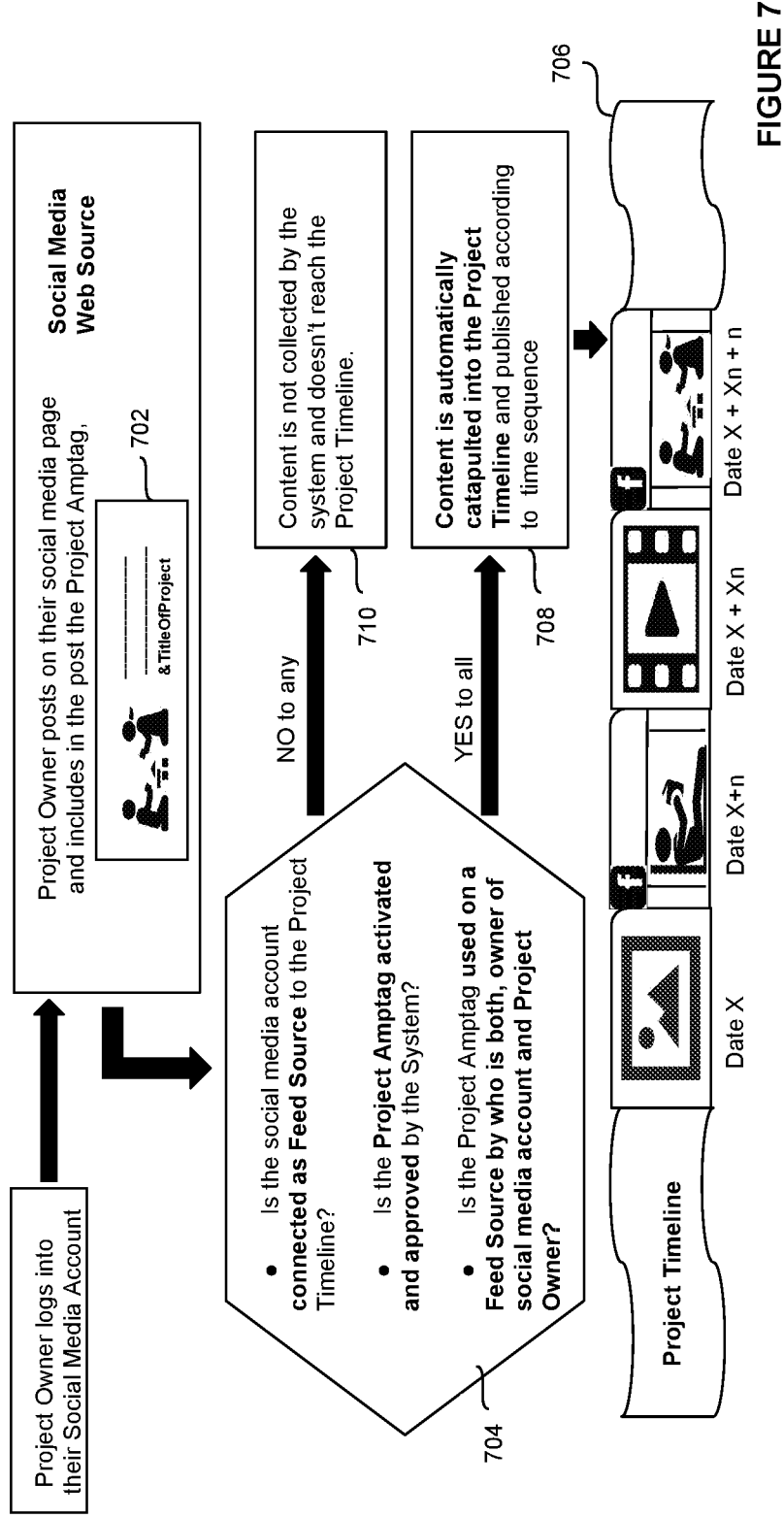
FIG. 7 is a pictorial illustration of the process of tracking, verification and "catapulting" of content marked with a project amptag.
Figure 8:
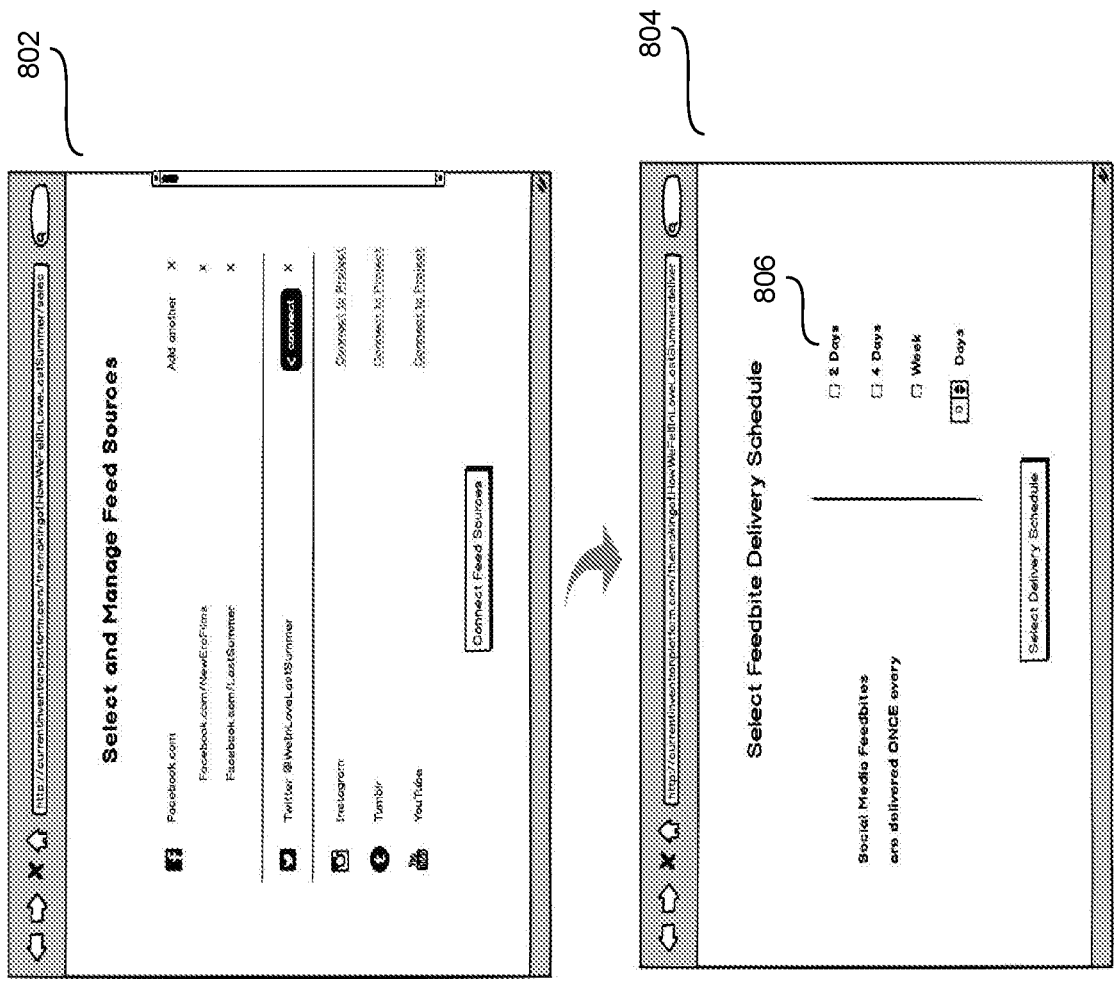
FIG. 8 is a pictorial Illustration of the project management interface for selecting and activating a schedule, here called "Feedbite Delivery Schedule", for aggregating social media content from web sources connected to the system, here called "Feed Sources"

The project owner then selects and activates a feedbite delivery schedule (216) as illustrated in FIG. 7. Subsequently, the project owner is directed to the feedbite aggregation page (218), also called "feedbite lot", on which the system aggregated content from the connected web sources according to the selected and activated "feedbite delivery schedule". The process of content aggregation by the system is described below. The feedbite lot is illustrated in FIG. 8 below.

On the feedbite lot page, the content owner selects relevant content and feeds it onto the project timeline (220). The process of manually selecting relevant content and feeding it onto the timeline is illustrated in further detail in FIG. 8 and FIG. 9. According to one embodiment of the current invention, the project owner can also use a project amptag (222) to forward relevant content from the connected feed sources directly onto the project timeline. Once created and activated (224) the project amptag can be used by the project owner to mark digital content, which they are posting on the connected feed sources (226), for example their social media accounts and pages (111), this way attributing their pre-shared social media content to their making-of storyline of on the platform. Such content is automatically posted onto the project storyline, a process we call "catapulting" of digital content onto the storyline.

As described, both "feeding the timeline" with imported, aggregated and manually selected digital content, and the direct "catapulting" of digital content onto the timeline, require connecting of third party web sources, e.g. social media platforms, such as Facebook, Twitter, Instagram, or other. The process of connecting a third party content platform, here called "feed source," is illustrated in FIG. 3. In the illustrated example, the project owner chooses to connect their Facebook account (302) to their project using their Facebook login credentials (304).

Figure 4:
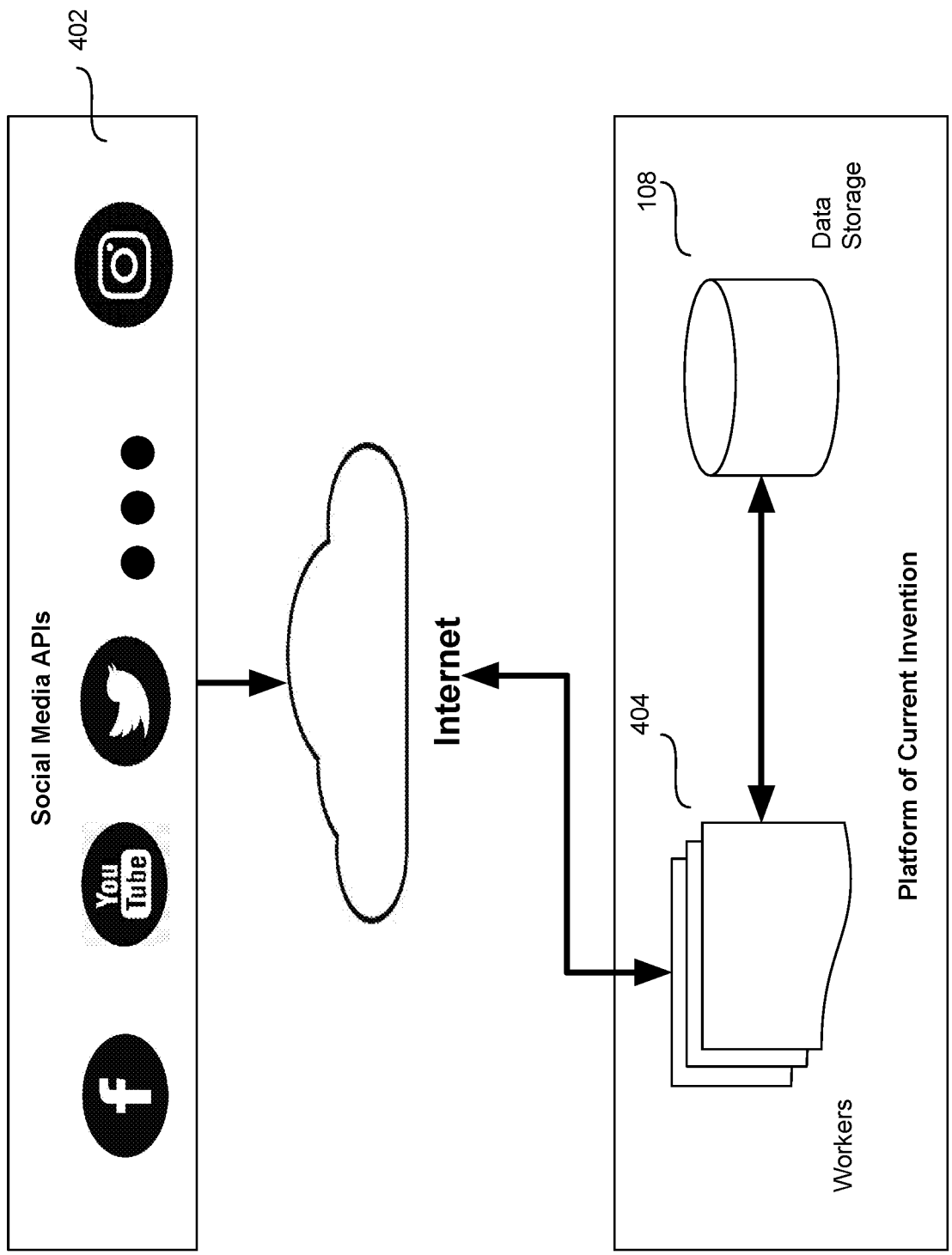
FIG. 4 is a pictorial illustration of the aggregation of content from third party web sources that are connected to the project by the project owner.

According to one embodiment, here shown in FIG. 4, as soon as one or multiple third party web sources are connected, the system uses publicly accessible Application Programming Interfaces, APIs, of the various web sources (402), for example the social media platforms, to track and collect content that has been posted on the social media accounts connected to the system This process is handled by the content tracking, verification, and collection module (106) using multiple background processes, here called workers (404), processing data from social media APis in regular time intervals. These workers use combination of proprietary and open-source solutions for obtaining, processing and storing the data in the content database (108).

Figure 5:
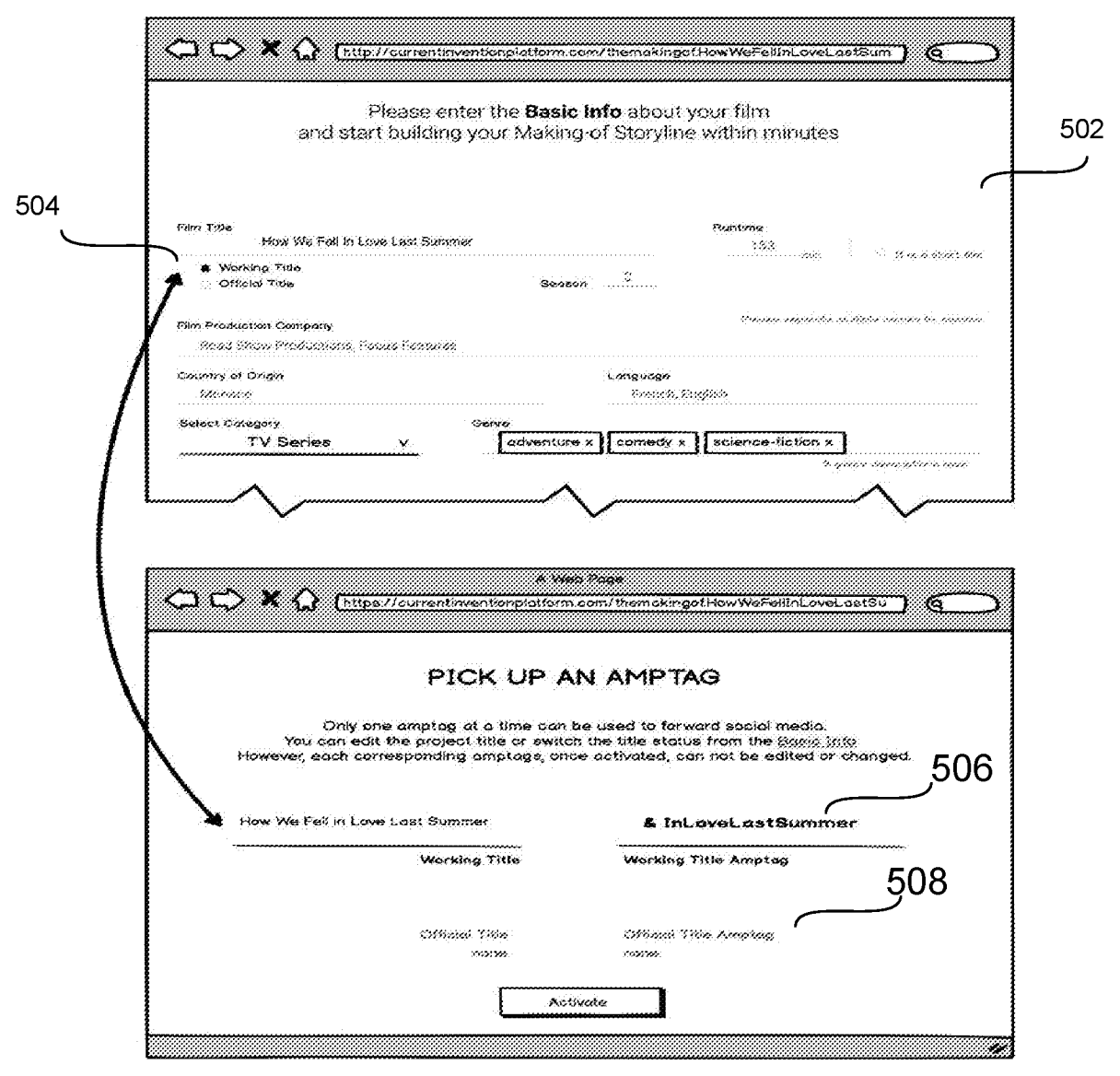

The set up and activation of the project amptag is shown in FIG. 5, which illustrate the selection and activation of an amptag for a film project. Each project amptag is unique and consists of the ampersand sign "&" followed by the title of the project as one word, or other one-word non-case sensitive combination of letters related to the project, for example &HowWeFellInLoveLastSummer, &WeLastSummer, or &LOVElastsummer. Either the working title or the official title of the film, as entered upon the project's registration in the Basic Info about the film (502), may be used for creating the project amptag, since it is often copyrighted as part of the work of authorship; when publicly disclosed it carries publishing rights and is important for the project's marketing, release and distribution initiatives.

For example, the project owner has already indicated in the system that their project title is currently a "working title" (504), and consequently, they can chose to select an amptag (506) corresponding to that working title, and start using it on their social media accounts connected to the platform. Later, when the official title is published, the project owner, may select and activate a new, official title amptag (508) if needed. Once activated, an amptag may not be edited or changed.

Figure 6:
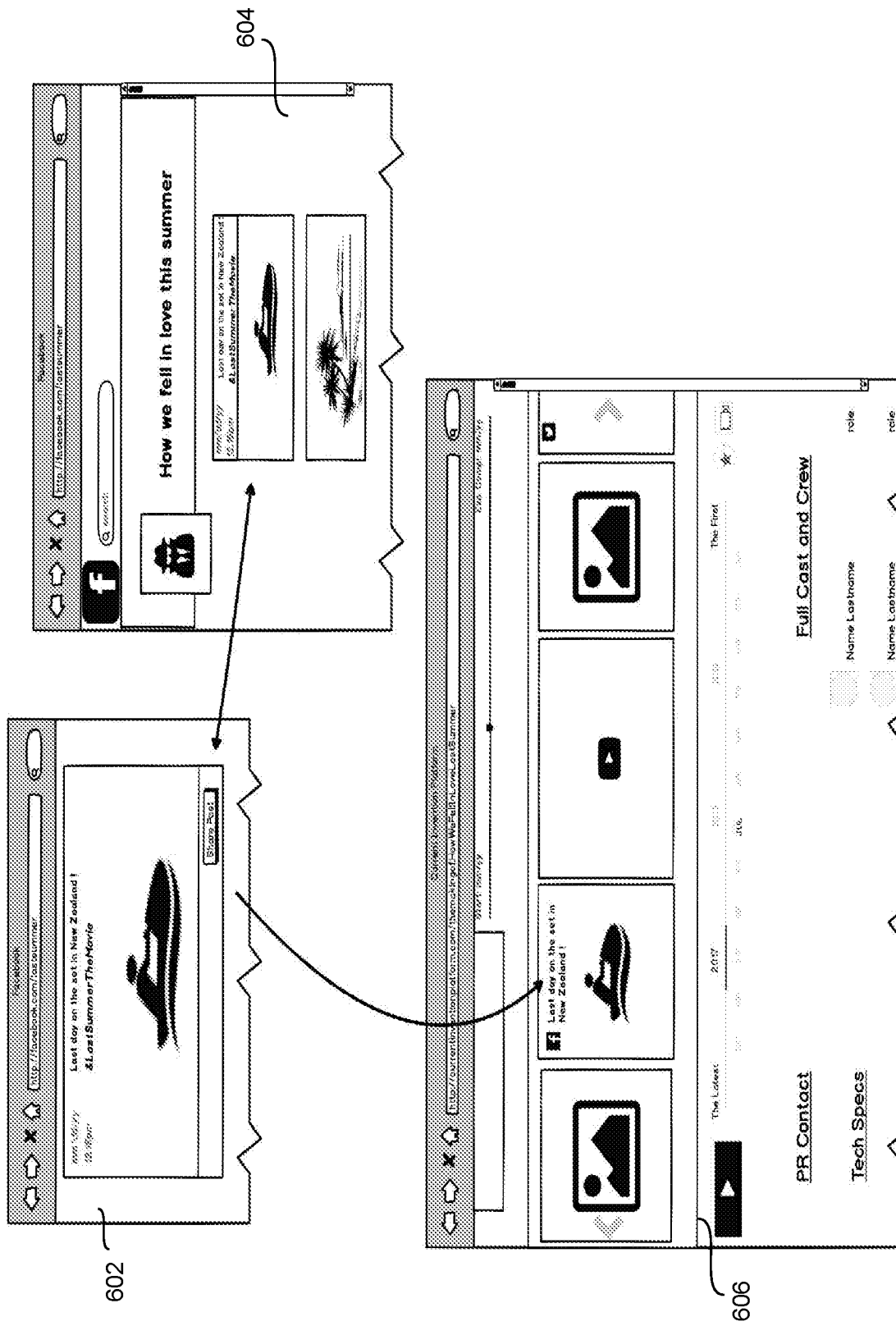
FIG. 6 is a pictorial illustration of project owners interaction view with the current invention, specifically the use of the project amptag by the project owner, within connected to the project social media of the same project owner.

FIG. 6 illustrates the use of the project amptag by the project owner to extract content (602), they have posted on their Facebook page (604), and which the project owner considers important to the making-of story, so that it needs to be "catapulted" directly onto the project timeline (606). According to one embodiment, the "catapulting" of digital content is implemented in the detection and attribution component (122), implemented by worker processes (404) that recognizes digital content marked by the project owner using a given amptag. Such marked content is then automatically posted directly onto the corresponding project timeline.

That is, the amptag is added to content on social media, and the detection and attribution component (122), implemented by worker processes (404), automatically recognizes the digital content marked by amptag and inserts it into the corresponding project timeline that is associated with the amptag. This includes adding the content to the media file and instructions that comprise the project timeline (which is one example of a mixed media presentation). In one embodiment, the project timeline comprises a set of media (e.g., photos, drawings, video and/or audio) and instructions for arranging and presenting that media. The use of the amptag improves operation of the system because the content to be added to the project timeline can be tagged when interacting with the social media site, rather than the time consuming manual adding of the content into the project timeline. This saves processing time on the computer creating the project timeline.

The automated process of catapulting of tagged content, here called "amptagging", can only be initiated by the project owner, and applied only to a project timeline, to which the project owner's external web accounts are connected. The process of amp-tagging does not allow for the public to forward and post any content onto the project timeline, nor it allows them to interfere in any other way in the project owner's storytelling and timeline.

Such technological distinction of the current invention in comparison to the currently existing tagging technologies, for instance the so called "hashtagging", is of great technological advancement. This restriction is critical when it comes to disclosing and protecting information about the creation of a product or work of authorship. The method of the current invention guarantees the authenticity of information and its distribution from one verified source onto the project timeline, in a controlled, audience facing environment: only authored by or otherwise owned by the project owner content, which is explicitly marked by the project owner with an amptag, is posted onto the project owner's storyline.

In one embodiment, when a the project owner starts a project, they input to the project hosting platform 102 a list of social media sites and the login credentials (e.g., username and password) to accounts on those sites. This information is stored in the database. The project hosting platform 102 then automatically and periodically checks those accounts on the social media sites using the login credentials to see if there is any new content associated with an amptag. The project hosting platform 102 looks for all amptags in those social media accounts. For any amptag found, the project hosting platform 102 checks its database to see if the amptag found matches any of the amptags registered for the project associated with the login credentials. If not, the content associated with the amptag is ignored. If so, the content associated with the amptag is imported into the project timeline. In this manner, a project owner can easily and securely add content to a project timeline by posting the content (e.g., media) to a social media site and then add an amptag with the content at the social media site. Persons who do not have the login credentials to the account at the social media site cannot add content to the project timeline in this manner.

FIG. 7 illustrates the usability flow of the usage of the project amptag on a third party platform, in this case the project owners Facebook account, and the mechanism of tracking, verification and collection of the content marked with an amptag. Further, it illustrates the detection and attribution of that marked pre-owned content, and the automatic catapulting of the pre-owned marked content onto the project timeline.

The process starts when the project owner includes the project amptag within an original post, on their social media page (702) connected to their project timeline.

According to one exemplary embodiment, only in the case of validation by the system of all verification provisions (704), can the amptaged content be catapulted from a specific social media account into a specific project timeline (706). The verification provisions can permit attribution of social media content posted by an account owner, to the project timeline, created by the same account owner, which is also the project owner of the project timeline, registered on the current invention's platform: the project owner is registered with the system, and their project is registered according to project registration requirements; the project owner has login credentials to the specific page or account the "amptaged" post is published on; the social media account is connected as "feed source" to the project timeline in the system; the project "amptag" for the given project is created and activated in the system.

The method described here defines the digital content that is catapulted (708) onto the project timeline strictly in accordance to these conditions set by the verification provisions, and excludes content which fails to satisfy any of the verification provisions (710). In the case of the project amptag being used by anyone else than the project owner, by being included in a posted on social media or the platform of the current invention content, the amptag may serve as a pointer or, where permitted, as a direct web link to the project page. Such "tagged" content that is not vetted by the system will not trigger the catapulting of that content onto the project timeline.

In one embodiment, the digital content that is catapulted onto the project timeline is also "linked" (in the sense of a web link) to the original source of content, the third party web source, here named "feed source", and, as a result, a user may choose to access a certain "imported" content and view it in its entirety, which would include for example all user's comments, on the third party web source from where it was imported. In the same embodiment, the content that is catapulted onto the project timeline includes only the initial individual post by the project owner/social media account owner, as it is shared on their account page, profile, wall, etc., including if the post is a "forward" or a "re-tweet" or similar. The catapulted content doesn't include the other users' comments, or any additional content or web links, added to the post by other users.

According to another embodiment, the system and method also allow for collection, aggregation and curation of all originally published on the connected "feed sources" digital content that has not been marked with the project amptag, and the option to manually post such content onto the project timeline, or as termed here "feed with updates" the project timeline.

This process is illustrated in FIG. 8 and FIG. 9 and according to one embodiment is implemented as follows.

FIG. 8 illustrates the project management UI, via which the project owner can select and activate a delivery schedule (804) for importing batches of content from the third party web content sources (802) which have already been connected to the project timeline, here termed "Feed Sources". The selection and management of the feed sources is illustrated in FIG. 3 above. As shown in FIG. 8, the project owner may select a delivery interval of, for example, 2, 4, 7 or X days (806). New batches of digital content are then retrieved according to the delivery time intervals selected by the project owner. In the current exemplary embodiment each chunk of content determined by the delivery time interval is called a "feedbite", and all retrieved content is aggregated on a "feedbite lot" (902), a project management interface comprising features and functions for manual content curation and distribution, as illustrated in FIG. 9.

As shown on FIG. 9, the project owner may manually select (904) from the content aggregated on the "feedbite lot" (902), imported from the connected feed sources (906), and post (or "feed") that content onto the project timeline (908), as relevant to the making-of storyline.

The aggregation of additional pre-owned content by the project owner described here, for the purposes of manual curation and attribution, additionally enhances the technological benefits of the current invention, by allowing the project owner and the creators of the corresponding work of authorship to "filter" their content-hosting web accounts and pages, and as a result, present and preserve in a form of a coherent storyline, all relevant to the making-of story content, thus creating the ultimate destination for the audiences to view the making of a work of authorship revealed by the makers.

Figure 10:
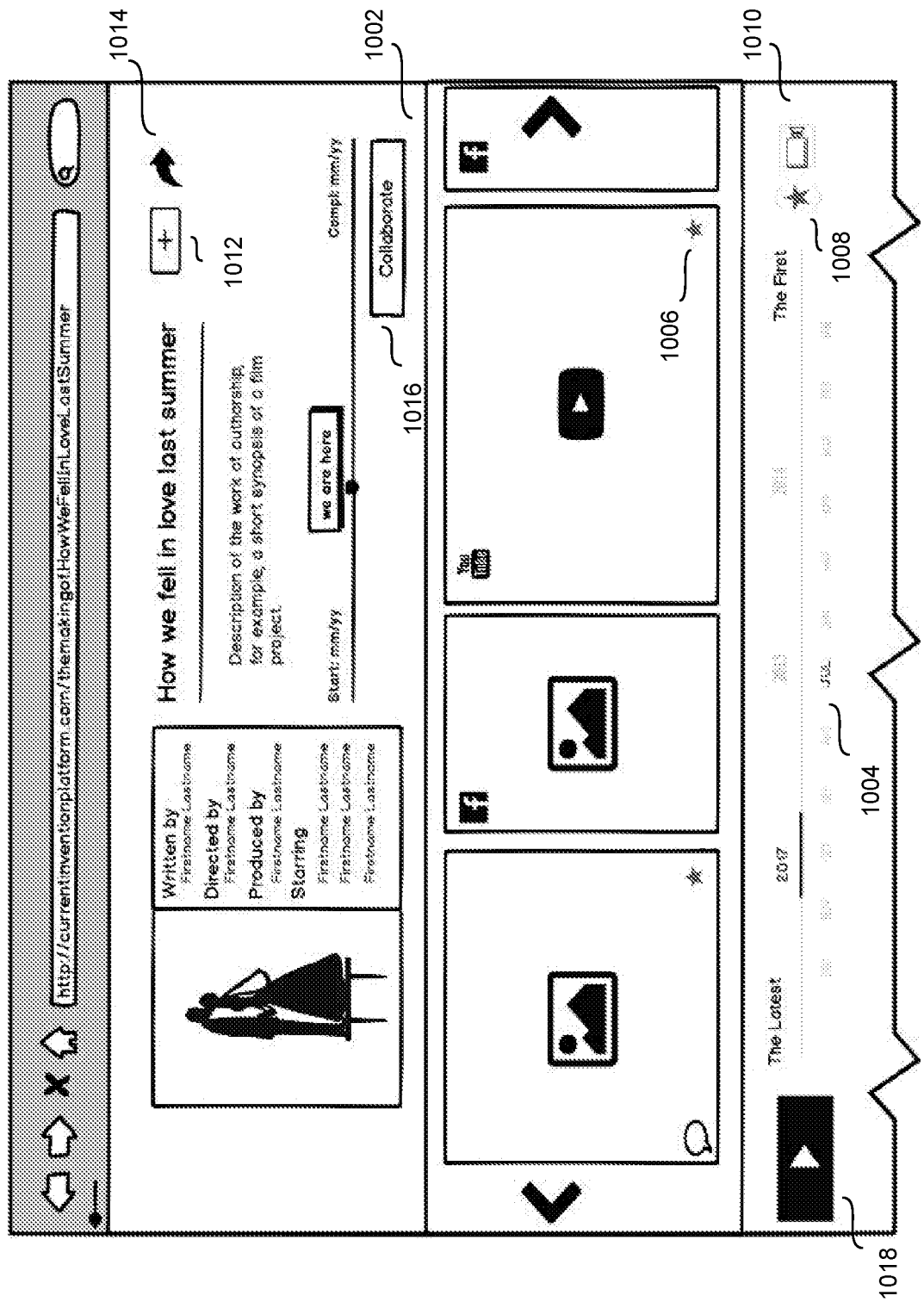

According to one embodiment, the project owner may remove all posts that have not been selected to be fed to the timeline (910). In another embodiment, the system may automatically remove all content that has been reviewed but not selected, at a later point in time, for instance when the project owner logs out of the system FIG. 10 illustrates how all digital content, either directly posted via uploading a file from a computer, selectively "catapulted" via amptag from connected feed sources, or manually curated on the feedbite lot and catapulted from there onto the project timeline, all together create a visually rich, mixed-media, evolving in real time, "making-of" storyline.

The method and system described here for collection and aggregation of content already shared through one or multiple social media platforms, onto a single web platform, is beneficial to anyone creating a specific work of authorship, because it serves, as described above, as filtering and verification mechanism for disclosing information about a work in progresses, which only the project owners or those authorized by the project owners can divulge.

The described invention is also beneficial to the audience of such a web platform, as it offers the advantage of receiving timely, first-hand information by verified sources, specifically, directly from the makers, about the making of their work, as it progresses in time and moves toward completion and release.

According to one exemplary embodiment, the audience can view the mixed media storyline (1002) in the chronological sequence in which it was built, or view specific parts of it selectively, by choosing a month and year from the timeline calendar (1004).

According to another exemplary embodiment, the project owner may highlight certain content (1006) as being with greater importance to the making-of story, for example certain milestones and key moments of success. The highlighted content may be recalled by the audience by a "highlights only" button (1008) and viewed as a visually condensed summary of the storyline. Similarly, the audience may select to view the "video only" (1010) content posted on the project timeline.

In one embodiment, the audience can add the project to their watchlist (1012), share the project via social media (1014), and professionally interested users may request to get in direct contact with the project owners for collaboration (1016), like potential partnership, acquisition or other business proposition.

In another embodiment the project timeline can be played (157) and viewed via visually enhanced storyline player (1018), where the entire content sequence is presented and played automatically in full screen format. In another embodiment, the visual presentation is enriched by animated transitions and effects.

A system and method for creating and curating of a mixed media project timeline (e.g., a digital storyline about the making of a specific product or work of authorship) using a web server (e.g., project hosting platform 102). The system involves registering an existing project by means of a web platform (e.g. a web server), and connecting to it via the project owner's credentials external web content sources, including the project owner's social media. The system involves activation of a project verification tag, here called amptag, consisting of the ampersand sign "&" followed by the title of the project as one word, or other relevant one-word combination of letters. The amptag can be included by the project owner within any content they post on the connected web sources. The system automatically searches the external web content sources and recognizes the marked content, verifies it toward the registered project and the project owner's credentials, and catapults it into the project storyline next to other original content posted by the project owner.

One embodiment includes a system for generating a mixed media presentation, comprising: a database configured to store media content and instructions for presenting the media content to comprise the mixed media presentation; and a server connected to the database and a network, the server configured to obtain the media content and store the obtained media content in the database, the server configured to provide the instructions for presenting the media content to the database, the server configured to communicate with a client computer and a social network computer via the network; the server is configured to create the mixed media presentation in response to instructions from the client computer and register the mixed media presentation in response to the client computer; the server is configured to automatically obtain at least a subset of the media content by automatically searching the social network computer for a project verification tag added by the client computer and automatically copying media content from the social network computer tagged by the project verification tag to the database.

In one example, the server is configured to guarantee authenticity of the media content and its distribution from prior to automatically copying the media content from the social network computer tagged by the project verification tag to the database.

In one example, the server is configured to input and store a set of secure tags for the mixed media presentation, input and store a list of social media sites and the login credentials to accounts on social media platforms for the mixed media presentation, automatically check the accounts on the social media platforms using the login credentials to see if there is any new media content associated with the secure tags, automatically add the new media content to the mixed media presentation if there is any new media content associated with the secure tags in the accounts on the social media platforms and refrain from adding new media content to the mixed media presentation for new media content associated with a tag that is not a secure tag stored by the server for the presentation.

In one example, the server is configured to validate the media content before automatically copying the media content from the social network computer tagged by the project verification tag to the database by verifying that the project verification tag was created on the server and stored in the database, verifying that the social media account on the social media computer is connected as feed source to the mixed media presentation in the server, verifying that a project owner associated with the mixed media presentation has login credentials to the specific page or account the project verification tag is published on the social network computer, and verifying that the project owner associated with the project verification tag is registered with the server.

In one example, the server is configured to validate the media content before automatically copying the media content from the social network computer tagged by the project verification tag to the database by verifying that a project owner associated with the project verification tag is registered with the server.

In one example, the server is configured to validate the media content before automatically copying the media content from the social network computer tagged by the project verification tag to the database by verifying that a project owner associated with the mixed media presentation has login credentials to the specific page or account the project verification tag is published on the social network computer.

In one example, the server is configured to validate the media content before automatically copying the media content from the social network computer tagged by the project verification tag to the database by verifying that the social media account on the social media computer is connected as feed source to the mixed media presentation in the server.

In one example, the server is configured to validate the media content before automatically copying the media content from the social network computer tagged by the project verification tag to the database by verifying that the project verification tag was created on the server and stored in the database.

In one example, the server is configured to validate the media content before automatically copying the media content from the social network computer tagged by the project verification tag to the database by verifying that project verification tag is stored in the database and connected to login credentials for a user of a social media account that is presenting the media content with the project verification tag.

In one example, the server comprises: a project management module comprises multiple project management interfaces for an owner of the mixed media presentation to interact with the server; a content tracking, verification and collection module is configured to interact through the network with the social media computer to detect newly shared media content on a project owner's social media accounts on the social media computer, the content tracking, verification and collection module verifies content source according to social media account ownership, aggregates the verified content and stores it in the database; a project presentation module that is configured to present the mixed media presentation based on the media content and instructions in the database; and a project verification tag detection and attribute component implemented by worker processes configured to automatically recognize media content marked by the project verification tag.

In one example, the server includes: a content tracking, verification and collection module is configured to interact through the network with the social media computer to detect newly shared media content on a project owner's social media accounts on the social media computer, the content tracking, verification and collection module verifies content source according to social media account ownership, aggregates the verified content and stores it in the database.

In one example, the server comprises: a project presentation module that is configured to present the mixed media presentation based on the media content and instructions in the database.

In one example, the server comprises: a project verification tag detection and attribute component implemented by worker processes configured to automatically recognize media content marked by the project verification tag.

In one example, the server comprises: a network interface configured to communicate on the network memory configured to store code; a processor connected to the network interface and the memory, the processor configured to be programmed by the code to perform the automatically obtaining at least a subset of the media content.

One embodiment includes an automated method for creating a mixed media presentation, comprising: registering a project at a server, the project associated with the mixed media presentation; connecting the project to external web content sources using a set of credentials; adding a project verification tag to media content in the external web content source; the server automatically searching the external web content sources and recognizing the project verification tag in the external web content sources; the server verifying the project and credentials for the recognized project verification tag in the external web content sources; the server automatically adding the media content to the mixed media presentation; and presenting the mixed media presentation via a data processing system In one example, the server verifying the project and credentials for the recognized project verification tag in the external web content sources comprising: verifying that the project verification tag was created on the server and stored in a database connected to the server; verifying that the social media account on the social media computer is connected as feed source to the mixed media presentation in the server; verifying that a project owner associated with the mixed media presentation has login credentials to the specific page or account the project verification tag is published in the external web content sources; and/or verifying that the project owner associated with the project verification tag is registered with the server.

One embodiment includes a non-transitory processor readable storage medium, comprising processor readable code that programs one or more processors to perform a method comprising: registering a project at a server, the project associated with the mixed media presentation; connecting the project to external web content sources using a set of credentials; adding a project verification tag to media content in the external web content source; the server automatically searching the external web content sources and recognizing the project verification tag in the external web content sources; the server verifying the project and the credentials for the recognized project verification tag in the external web content sources; the server automatically adding the media content to the mixed media presentation; and presenting the mixed media presentation via a data processing system.

One embodiment includes a system comprising: an apparatus of web based technology for creating, curating, and publishing of mixed media project timeline, a digital storyline, about the making of a specific product or work of authorship by the project owner; an apparatus for tracking, identification, and extraction of digital content from multiple web sources the project owner has login credentials to and connects to the project timeline; a detection, verification and attribution (or collection) module for catapulting and positioning onto the project timeline of published by the project owner content from the connected web sources via the use of the called here "project amptag" consisting of the ampersand sign "&" followed by the title of the project as one word, or other related to the project one-word combination of letters; and a differentiation and prevention mechanism embedded within the detection, verification and collection module, which ensures that only content authored or otherwise owned by the project owner is included in the digital storyline, and the project amptag, when used by anyone else, on any platform including the connected web sources, would serve only, as a short reference keyword, or where permitted, as an URL to the project page.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them For purposes of this document, the term "based on" may be read as "based at least in part on." For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

I claim:

1. A system for generating a mixed media presentation, comprising:
    a database configured to store media content and instructions for presenting the media content to comprise the mixed media presentation; and
    a server connected to the database and a network, the server configured to obtain the media content and store the obtained media content in the database, the server configured to communicate with a client computer and a social network computer via the network;
    the server is configured to create the mixed media presentation in response to instructions from the client computer and transmit the mixed media presentation in response to the client computer;
    the server is configured to automatically obtain at least a subset of the media content by automatically searching the social network computer for a project verification tag added by the client computer and automatically copying media content from the social network computer tagged by the project verification tag to the database, the verification tag comprising a non-letter symbol concatenated with a project title.

2. The system of claim 1, wherein:
    the server is configured to input and store a set of secure tags for the mixed media presentation, input and store a list of social media sites and the login credentials to accounts on social media platforms for the mixed media presentation, automatically check the accounts on the social media platforms using the login credentials to see if there is any new media content associated with the secure tags, automatically add the new media content to the mixed media presentation if there is any new media content associated with the secure tags in the accounts on the social media platforms and refrain from adding new media content to the mixed media presentation for new media content associated with a tag that is not a secure tag stored by the server for the presentation.

3. The system of claim 1, wherein:
    the server is configured to validate the media content before automatically copying the media content from the social network computer tagged by the project verification tag to the database by verifying that the project verification tag was created on the server and stored in the database, verifying that the social media account on the social media computer is connected as feed source to the mixed media presentation in the server, verifying that a project owner associated with the mixed media presentation has login credentials to the specific page or account the project verification tag is published on the social network computer, and verifying that the project owner associated with the project verification tag is registered with the server.

4. The system of claim 1, wherein:
    the server is configured to validate the media content before automatically copying the media content from the social network computer tagged by the project verification tag to the database by verifying that a project owner associated with the project verification tag is registered with the server.

5. The system of claim 1, wherein:
    the server is configured to validate the media content before automatically copying the media content from the social network computer tagged by the project verification tag to the database by verifying that a project owner associated with the mixed media presentation has login credentials to the specific page or account the project verification tag is published on the social network computer.

6. The system of claim 1, wherein:
    the server is configured to validate the media content before automatically copying the media content from the social network computer tagged by the project verification tag to the database by verifying that the social media account on the social media computer is connected as feed source to the mixed media presentation in the server.

7. The system of claim 1, wherein:
the server is configured to validate the media content before automatically copying the media content from the social network computer tagged by the project verification tag to the database by verifying that the project verification tag was created on the server and stored in the database.

8. The system of claim 1, wherein:
the server is configured to validate the media content before automatically copying the media content from the social network computer tagged by the project verification tag to the database by verifying that project verification tag is stored in the database and connected to login credentials for a user of a social media account that is presenting the media content with the project verification tag.

9. The system of claim 1, wherein the server comprises:
a project management module comprises multiple project management interfaces for an owner of the mixed media presentation to interact with the server;
a content tracking, verification and collection module is configured to interact through the network with the social media computer to detect newly shared media content on a project owner's social media accounts on the social media computer, the content tracking, verification and collection module verifies content source according to social media account ownership, aggregates the verified content and stores it in the database;
a project presentation module that is configured to present the mixed media presentation based on the media content and instructions in the database; and
a project verification tag detection and attribute component implemented by worker processes configured to automatically recognize media content marked by the project verification tag.

10. The system of claim 1, wherein the server comprises:
a content tracking, verification and collection module is configured to interact through the network with the social media computer to detect newly shared media content on a project owner's social media accounts on the social media computer, the content tracking, verification and collection module verifies content source according to social media account ownership, aggregates the verified content and stores it in the database.

11. The system of claim 1, wherein the server comprises:
a project presentation module that is configured to present the mixed media presentation based on the media content and instructions in the database; and
the server comprises a network interface configured to communicate on the network, memory configured to store code, and a processor connected to the network interface and the memory, the processor is configured to be programmed by the code to perform the automatically obtaining at least a subset of the media content.

12. The system of claim 1, wherein the server comprises:
a project verification tag detection and attribution component implemented by worker processes configured to automatically recognize media content marked by the project verification tag.

13. An automated method for creating a mixed media presentation, comprising:
registering a project at a server, the project associated with the mixed media presentation;
connecting the project to external web content sources using a set of credentials;
adding a project verification tag to media content in the external web content source, the verification tag comprising a non-letter symbol concatenated with a title of the registered project;
the server automatically searching the external web content sources and recognizing the project verification tag in the external web content sources;
the server verifying the project and credentials for the recognized project verification tag in the external web content sources;
the server automatically adding the media content to the mixed media presentation; and
presenting the mixed media presentation via a data processing system.

14. The method of claim 13, wherein the server verifying the project and credentials for the recognized project verification tag in the external web content sources comprising:
verifying that the project verification tag was created on the server and stored in a database connected to the server,
verifying that the social media account on the social media computer is connected as feed source to the mixed media presentation in the server,
verifying that a project owner associated with the mixed media presentation has login credentials to the specific page or account the project verification tag is published in the external web content sources; and
verifying that the project owner associated with the project verification tag is registered with the server.

15. The method of claim 13, wherein the server verifying the project and credentials for the recognized project verification tag in the external web content sources comprising:
verifying that the project verification tag was created on the server and stored in a database connected to the server.

16. The method of claim 13, wherein the server verifying the project and credentials for the recognized project verification tag in the external web content sources comprising:
verifying that the social media account on the social media computer is connected as feed source to the mixed media presentation in the server.

17. The method of claim 13, wherein the server verifying the project and credentials for the recognized project verification tag in the external web content sources comprising:
verifying that a project owner associated with the mixed media presentation has login credentials to the specific page or account the project verification tag is published in the external web content sources.

18. The method of claim 13, wherein the server verifying the project and credentials for the recognized project verification tag in the external web content sources comprising:
verifying that the project owner associated with the project verification tag is registered with the server.

19. The method of claim 13, wherein the server verifying the project and credentials for the recognized project verification tag in the external web content sources comprising:
verifying that the project verification tag was created on the server and stored in a database connected to the server; and
verifying that a project owner associated with the mixed media presentation has login credentials to the specific page or account the project verification tag is published in the external web content sources.

20. A non-transitory processor readable storage medium, comprising processor readable code that programs one or more processors to perform a method comprising:
registering a project at a server, the project associated with the mixed media presentation;
connecting the project to external web content sources using a set of credentials;
adding a project verification tag to media content in the external web content source, the verification tag comprising a non-letter symbol concatenated with a title of the registered project;

the server automatically searching the external web content sources and recognizing the project verification tag in the external web content sources;

the server verifying the project and the credentials for the recognized project verification tag in the external web content sources;

the server automatically adding the media content to the mixed media presentation; and presenting the mixed media presentation via a data processing system.

* * * * *